April 21, 1964     J. P. WAGNER     3,129,722
PNEUMATIC INDICATING AND RELAY DEVICES
Filed Feb. 15, 1961     3 Sheets-Sheet 1
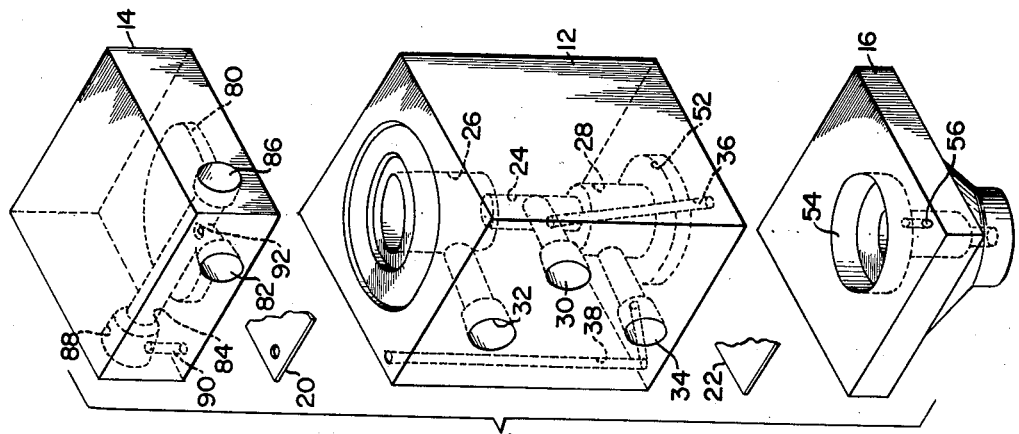
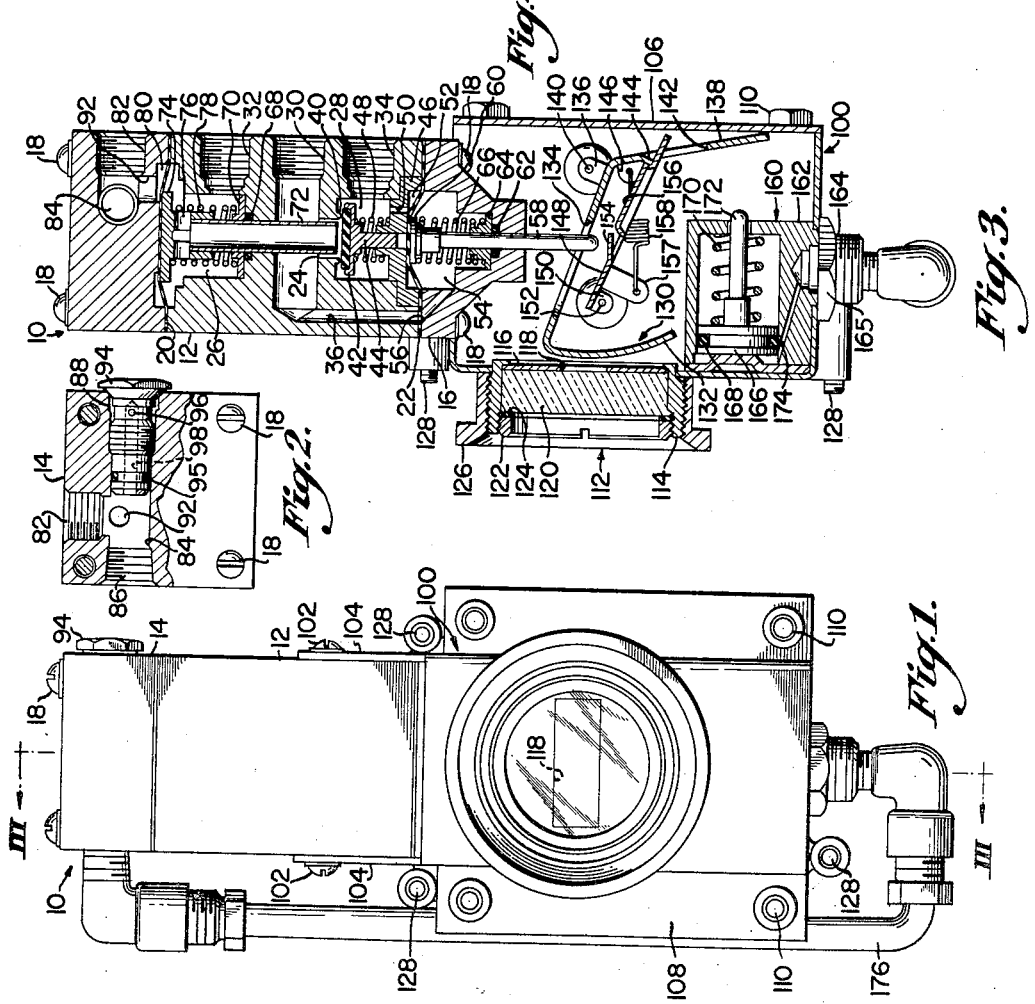

April 21, 1964

J. P. WAGNER 3,129,722

PNEUMATIC INDICATING AND RELAY DEVICES

Filed Feb. 15, 1961

April 21, 1964
J. P. WAGNER
3,129,722
PNEUMATIC INDICATING AND RELAY DEVICES
Filed Feb. 15, 1961
3 Sheets-Sheet 3
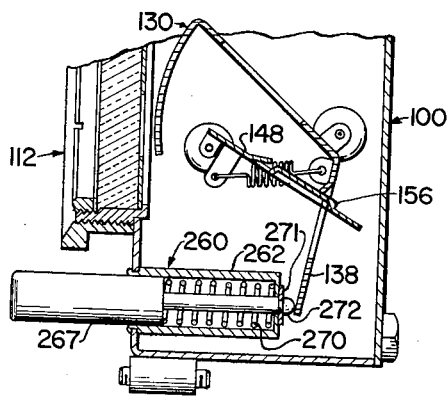
Fig. 11.
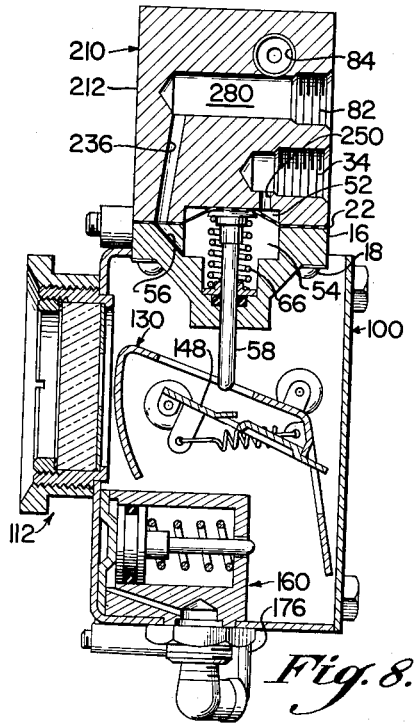
Fig. 8.
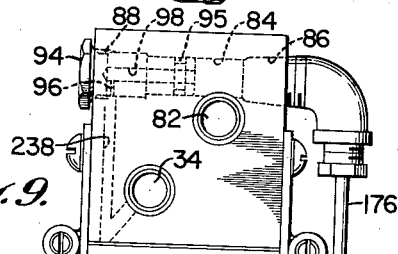
Fig. 9.
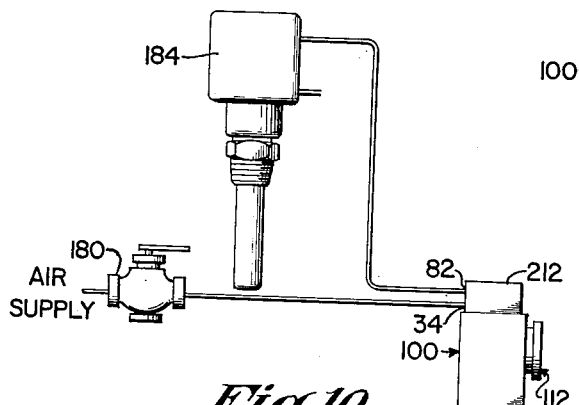
Fig. 10.
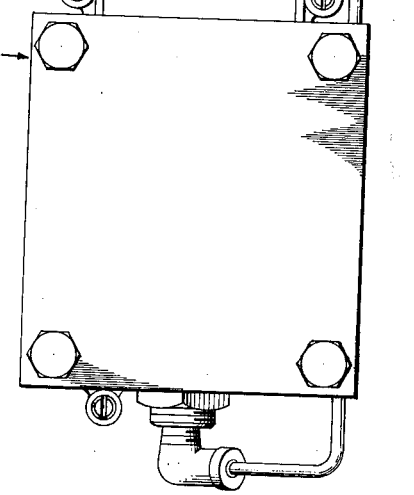

United States Patent Office 3,129,722
Patented Apr. 21, 1964

3,129,722
PNEUMATIC INDICATING AND RELAY DEVICES
Joseph P. Wagner, Knoxville, Tenn., assignor to Robertshaw Controls Company, a corporation of Delaware
Filed Feb. 15, 1961, Ser. No. 89,429
18 Claims. (Cl. 137—557)

This invention relates to indicating and relay devices and more particularly to pneumatically operated devices having indicator means and valve control means.

An object of this invention is to utilize the pressure conditions in a pneumatically operated device to actuate an indicator of such conditions.

Another object of this invention is to position the indicator of a pneumatically operated device in accordance with predetermined pressure conditions in the device.

This invention has another object in that the indicator of a pneumatically operated device is moved to one position by differential pressure conditions in the device and to another position independent of such conditions.

Another object of this invention is to reset the indicator of a pneumatically operated device independently of the actuating means for such indicator.

A further object of this invention is to prevent bleed-off of the supply in a pneumatic control device.

This invention has a further object in that pressure release in a pneumatic relay indicator actuates a control valve which in turn actuates an indicator.

This invention has a further object in that the relay section of a pneumatic relay indicator is pressurized through a restricted orifice.

This invention has a further object in that the vent port of a pneumatic relay indicator is closed upon pressurization prior to the opening of a control port.

In practicing this invention, a valve body is connected to a pneumatic supply and is provided with an outlet port adapted to be connected to a condition responsive transmitter of the type which monitors a variable associated with engine operation. A differential pressure in the valve body is utilized to actuate an indicator which remains in its actuated condition until returned by reset means which operates the indicator independently of the differential pressure actuator. Diaphragm operated valve means in the valve body alternatively controls the flow of air to an atmospheric vent port and to a control port in accordance with the differential pressure in the valve body. The indicating means may be additionally provided with an electric switch whereby indicating lights or alarms are remotely located.

Other objects and advantages of the invention will appear more fully from the following description taken in connection with the accompanying drawings wherein:

FIG. 1 is a front elevation of a device embodying this invention;

FIG. 2 is a partial section of a detail of FIG. 1;

FIG. 3 is a section taken substantially on line III—III of FIG. 1 but staggered to include offcenter details;

FIG. 4 is an exploded perspective of the upper half of FIG. 1;

FIG. 8 is a longitudinal section of another embodiment;

FIG. 9 is a rear elevation of FIG. 8;

FIG. 10 is a schematic diagram of a system embodying the devices of FIGS. 8 and 9; and FIG. 11 is a partial section of a modified detail of FIG. 3.

Figure 7:
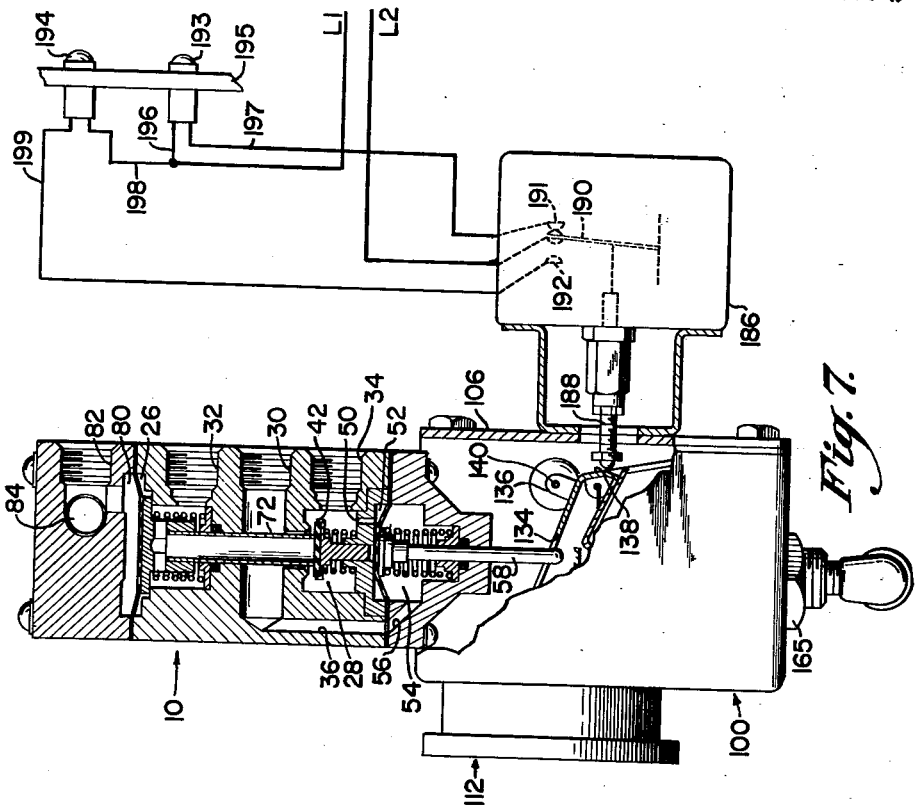
FIG. 7 is a partial sectional side elevation of FIG. 1 with an added embodiment.
Figure 5:
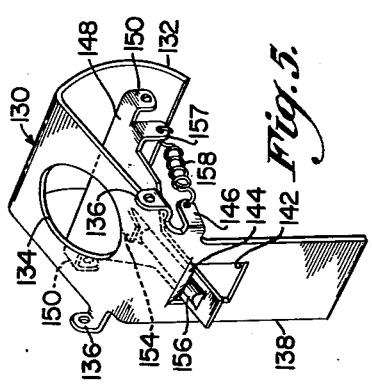
FIG. 5 is a perspective of a detail of FIG. 3.

Referring now to FIG. 3, a pneumatic relay indicator of rectangular configuration, indicated generally at 10, has a valve casing comprising a body member 12, a top member 14 and a bottom member 16 secured together as by bolts 18. Top and bottom flexible diaphragms 20 and 22 extend between the body member 12 and the top and bottom members 14, 16, respectively. The rectangular body 12 has an intermediate bore 24 concentrically arranged along its major axis and extending between top and bottom counerbores 26 and 28. Three spaced ports 30, 32, and 34, laterally offset from the vertical plane defining the major axis, extend perpendicularly into a side face of the body 12 a sufficient distance for tangential intersection with the bores 24, 26, and 28 which respectively define a control pressure chamber, an atmospheric pressure chamber, and an inlet pressure chamber. A bottom surface of body 12 is angularly bored to define a separate passageway 36 communicating with the control port 30. The body member 12 is suitably bored to define a second passageway 38 having a substantially L-shaped configuration with one end communicating with the inlet port 34 and the opposite end opening into the top surface.

The bottom of the intermediate bore 24 is enlarged and defines an annular valve seat 40 which is engageable by a valve disc 42 having a disc of suitable sealing material on one side and a valve stem 44 on the other side. The cylindrical wall defining the lower portion of the inlet pressure chamber 28 is suitably notched to receive a stepped insert member 46 which is held in place by means of the bottom member 16. The valve stem 44 reciprocates within a central bore in the insert member 46 and a coil spring 48, encircling the valve stem 44, is mounted in compression between the insert 46 and the valve disc 42. A passage 50 in the insert member 46 establishes communication between the inlet pressure chamber 28 and a pressure cavity 52 defined by the lower surface of the stepped insert 46 and the top of the flexible diaphragm 22. The other side of the flexible diaphragm 22 cooperates with a portion in the bottom member 16 to define a pressure cavity 54. The bottom member 16 has a drilled bore 56 which communicates with the passageway 36 through a suitable hole in the gasket 22 to establish communication between the pressure cavity 54 and the control pressure chamber 24.

The lower body member 16 has a central opening through which a plunger actuator 58 protrudes. A plunger head 60 is disposed within the cavity 54 and engages the lower surface of the flexible diaphragm 22. The wall defining the cavity 54 has an annular notch adjacent the central opening for the reception of an O-ring seal 62 and a collar 64 through which the plunger actuator 58 reciprocates. A coil spring 66 is mounted in compression between the plunger head and the collar 64.

The cylindrical wall defining the upper end of the intermediate bore 24 is suitably notched to receive an O-ring seal 68 which is held in place by guide washer 70. A tubular valve member 72 reciprocates through the seal 68 and washer 70 and through the intermediate bore 24 where its lower end is disposed adjacent the valve disc 42 for actuation thereof. As is illustrated in FIG. 3, the lower portion of tubular valve 72 and the wall defining the enlarged valve seat 40 is provided with sufficient clearance therebetween to define an annular passageway. A generally cup-shaped head member 74 is integrally attached to the upper end of tubular valve member 72 and is provided with a perpendicularly disposed port 76 communicating with the interior of the tubular valve member 72 to define a T-shaped passageway. A coil spring 78 encircles the upper end of the tubular valve member 72 and is mounted in compression between the guide washer 70 and the head member 74 biasing the same into engagement with the flexible diaphragm 20.

The undersurface of the upper body member 14 is suitably notched to define a transmitter pressure chamber 80, the lower wall of which is defined by the flexible diaphragm 20. A transmitter pressure port 82 extends into a side face of the body 14 on the same side face as the ports 30, 32, and 34 and intersects a through bore 84 perpendicularly disposed thereto. One end of the through bore 84 defines an outlet port 86 while the opposite end is enlarged to define an outer annular wall of an orifice chamber 88 which communicates with the passageway 38 in the body 12 by means of a passageway 90 axially aligned therewith and a suitable hole in the flexible diaphragm 20. The undersurface of the body member 14 is drilled at the point of intersection of the transmitter port 82 and the through bore 84 to define a passageway 92 for establishing communication between the chamber 80 and the through bore 84. An orifice plug 94 has an annular recess on its inner end carrying an O-ring seal 95 disposed in the bore 84 and has a head portion provided with a chamfered metal-to-metal contact seal adjacent its outer edge. A reduced neck portion on the orifice plug 94 forms the inner annular wall of the pressure chamber 88 and is provided with a radial bore 96 defining a restricted orifice which is intersected at its inner end by a longitudinal bore 98 axially extending into the orifice plug 94 and opening into the through bore 84.

An annunciator housing 100 is secured to the body member 12 as by bolts 102 extending through projected side members 104. The rear of housing 100 includes a removable back plate 106 secured to side flanges 108 as by bolts 110. The front of housing 100 is provided with a window assembly indicated generally at 112. As is illustrated in FIG. 3, the window assembly 112 includes a threaded boss 114 integrally secured to the housing in any suitable manner. A circular window frame 116 is disposed in the bottom of the boss and is provided with a rectangular opening 118 for viewing the interior of the housing 100. A circular window 120 of glass or other transparent material is positioned against the frame 116 and held in place by a locking ring 122 interiorly threaded into boss 114 with an annular gasket 124 disposed therebetween. An escutcheon ring 126 is exteriorly threaded on the boss 114 and is provided with an annular flange for engagement with the front surface of a mounting panel (not shown). A plurality of set screws 128 are adjustably carried by the housing 100 for engaging the rear surface of a mounting panel and cooperate with the annular flange of the escutcheon ring 126 for clamping the mounting panel therebetween.

A generally U-shaped indicating lever 130 in the housing 100 has a front indicating portion 132 divided into upper and lower portions which are color coded, e.g., green and red, to indicate visually through the window opening 118 a safe or unsafe condition of a monitored variable. The connecting portion of the U-shaped lever 130 has a large central aperture 134 and a pair of mounting tabs 136 adjacent a rear leg portion 138. The mounting tabs 136 are pivotally mounted on a pivot pin 140 carried by the opposite sides of the housing 100. The rear leg 138 is provided with a rectangular opening 142, the upper edge of which is bent to form a keeper tab 144. Adjacent its upper end, one side of the rear leg 138 has a perpendicularly bent lug 146. A substantially T-shaped latching lever 148 has a pair of mounting tabs 150 adjacent its forward end for receiving a pivot pin 152 carried by the opposite sides of the housing 100. An actuating tab 154 is bent upwardly from the latching lever 148 so as to be centrally positioned relative to the aperture 134 for engagement with the actuating plunger 58 which extends through the aperture 134.

Extending toward its free end, the latching lever 148 has an upper raised surface forming a detent 156; the free end of latching lever 148 protrudes through the aperture 142 in the indicating lever and the outer edge of the detent 156 cooperates with the tab 144 on the indicating lever 130. Adjacent its forward end, the latching lever 148 is provided with a bent over lug 157 and a coil spring 158 is mounted in tension between the lug 157 and the lug 146 on the indicator lever 130.

The tension spring 158 urges the indicating lever in a clockwise direction about the pivot pin 140 (FIG. 3) and urges the latching lever in a counterclockwise direction about the pivot pin 152. When in a latched condition, rotation of the two levers 130 and 148 is prevented by the engagement of the keeper tab 144 with the detent 156. Downward movement of the actuating plunger 58 causes clockwise movement of the latching lever 148 whereupon the keeper tab 144 is released from the edge of the detent 156 and the indicating lever 130 rotates under the bias of the tension spring 158 to a released position.

Clockwise rotation of the indicating lever 130 to its released position is limited by the engagement of the lower end of rear leg 138 with a reset mechanism indicated generally at 160. The reset mechanism 160 includes a housing 162 securely fastened interiorly of the lower portion of housing 100 by means of a threaded boss 164 and nut 165 extending through a bottom wall of the housing 100. The housing 162 includes a cylindrical chamber in which a piston 166 is reciprocably mounted. The piston 166 has a grooved head in which an O-ring seal 168 is mounted. A piston plunger 172 extends axially rearwardly of the piston 166 and extends through a suitable aperture in the housing 162 to engage the rear leg 138 of the indicating lever 130. A coil spring 170 surrounds the piston actuator 172 and is mounted in compression between the rear face of the piston 166 and the bottom wall of the cylinder chamber. Pressure is applied to the top of the piston head 166 by means of a passageway 174 in housing 162 extending from the opening in the threaded boss 164. Conduit means 176 extends from the outlet port 86 in the top body member 14 to the opening in the threaded boss 164 to establish communication between the transmitter pressure chamber 80 and the cylinder chamber of the reset mechanism 160.

Figure 6:
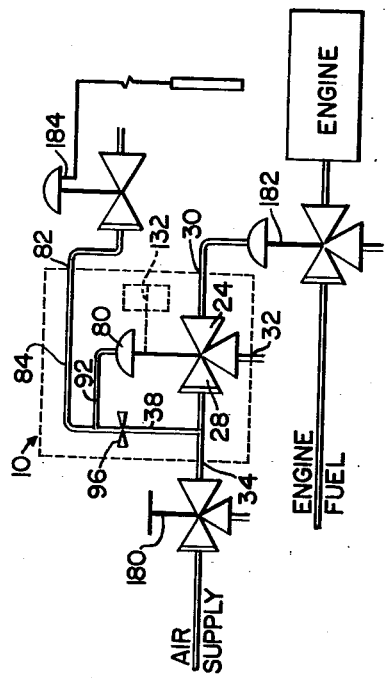
FIG. 6 is a schematic diagram of a system embodying the device of FIG. 1.

While the foregoing relay indicator may have varied applications and may use many kinds of fluids, its sequence of operation will be described with reference to FIG. 6 wherein a pneumatic control system is utilized to indicate the condition of a monitored variable of an engine and to shut down a supply of fuel to the engine in response to predetermined changes of such variable. A supply of air furnishes the pneumatic pressure for the system under the control of a manual three-way valve 180. A supply of fuel to the engine is controlled by a normally closed diaphragm actuated transfer valve 182. A pneumatic transmitter valve 184 is utilized so as to be responsive to some predetermined engine variable, such as temperature, pressure, vibration, motion, etc. When the monitored variable is within a safe limit, the transmitter valve 184 is closed; however, if the monitored variable is outside of a safe limit, the valve 184 is opened so that the air supply from port 82 is vented to atmosphere through the opened valve 184. The pneumatic system is rendered operative upon opening of the manual valve 180 supplying air to the inlet port 34 of the relay indicator 10. The flow of air continues through the bypass passageway 38, the orifice means 96 and into the through bore 84, thence through passage 92 into the transmitter pressure chamber 80; a parallel pneumatic circuit may be traced from the through bore 84 through the transmitter port 82 to the transmitter valve 184.

Assume now that the transmitter valve 184 is closed because the monitored variable is within safe limits, the relay indicator 10 is pressurized and the pressure in transmitter chamber 80 causes a downward movement of the diaphragm 20 and the valve member 72 which seats on the disc 42 causing opening movement of the valve 42 relative to the valve seat 40. Such an arrangement results in a non-bleed pneumatic system since the valve member 72 closes and prevents flow to the vent port 32 prior to the opening of the valve member 42. In this non-bleed system, there is no loss of the supply air.

Upon opening of the valve member 42, the supply of air flows through the supply chamber 28 into the control chamber 24 and out of the control port 30 causing actuation of the engine shut down valve 182 to its open position to permit a flow of fuel to the engine. A parallel flow of air may be traced from the control chamber 24 into the passageways 36 and 56, into the lower actuator cavity 54. The upper cavity 52 is pressurized by means of the passageway 50 communicating with the supply pressure chamber 28, thus establishing an equal pressure differential across the diaphragm 22 so that the actuator 58 is biased to its position shown in FIG. 3 by the coil spring 66. Inasmuch as the transmitter valve 184 is pressurized, air is supplied through outlet port 86, conduit means 176, the opening in the threaded boss 164, and passageway 174 to the cylinder chamber of the reset mechanism causing movement of the piston 166 against the bias of coil spring 170 whereupon the plunger 172 moves the indicating lever arm 138 which is latched in the safe position by the engagement of the tab 144 and the edge of detent 156.

Once the system is pressurized, the various valve members will be in the positions shown in FIG. 7 (to be described hereinafter). In the event the monitored variable is changed to an unsafe condition by engine malfunction, the transmitter valve 184 transfers to its open position whereby the transmitter port 82 is vented to the atmosphere. At this time, the cylinder chamber of the reset mechanism 160 is vented out of the transmitter port 82 permitting the piston head 166 to move to its depressed position under the bias of the coil spring 170. Simultaneously, the transmitter pressure chamber 80 is likewise vented to the atmosphere through the passageway 92 and the transmitter port 82 through the transmitter valve 184.

The restricted orifice means 96 has such a small cross sectional flow area relative to that of transmitter port 82 that once the port 82 is vented, the flow from orifice means 96 is not sufficient to pressurize the chamber 80. The loss of pressure in the transmitter pressure chamber 80 permits the coil spring 78 to move the valve member 72 upwarly as viewed in FIG. 3, permitting the supply valve 42 to close under the bias of coil spring 48; with the valve members moved to the positions shown in FIG. 3, the control pressure chamber 24 is vented to the atmosphere through the tubular valve member 72, the cross passageway 76, the atmospheric pressure chamber 26, and the atmospheric vent port 32.

Upon loss of pressure in the control pressure chamber, the engine safety valve 182 returns to its normally closed position cutting off a supply of fuel to the engine for engine shut down. At the same time, the air in cavity 54 is vented through passage 56, an aligned hole in diaphragm 22, passageway 36 to control pressure chamber 24 where it is likewise vented by way of valve member 72, through vent port 32 to atmosphere.

With the loss of pressure in the actuator cavity 54, there is a pressure differential across the diaphragm 22 inasmuch as the upper cavity 52 is subject to inlet supply pressure through its passageway 50. The higher pressure in cavity 52 causes actuation of the diaphragm and plunger head 60 against the bias of coil spring 66, whereupon the plunger actuator 58 moves the actuating tab 154 and pivots the latching lever 148 clockwise about its pivot pin 152. Downward movement of the latching lever 148 moves the edge of the detent 156 away from the keeper tab 144 on the indicator lever 130 and permits the indicator lever 130 to pivot about its pivot pin 140 in a clockwise direction whereby the red or unsafe portion of the indicator 132 is now visible through the window assembly 112.

It should be noted that the indicator lever 130 will remain in this position until the monitored variable is returned to within safe limits. Thus, even if the manual air supply valve 180 should be turned to its off position, the indicator 132 will continue to show an unsafe condition, thereby pin-pointing the particular malfunction causing engine shut down. In the event the manual air supply valve 180 is turned to its off position when the indicator 132 shows a safe condition, the indicator 132 will remain in this position because of the latching mechanism. This has a particular advantage when a plurality of the pneumatic relays are used with a corresponding plurality of transmitter valves to monitor a plurality of engine variables.

A modification is disclosed in FIG. 7 wherein the pneumatic relay 10 is incorporated with a switching mechanism and suitable wiring to give an indication on a remotely located panel board. In this modification, a switch housing 186 is secured to the backplate 106 of the annunciator housing 100 and includes a plunger 188 extending through a suitable aperture in the backplate 106 for engagement with the rear leg 138 of the indicating lever 130. The plunger 188 is normally biased against the lever leg 138 so that plunger movement follows indicating lever movement. The opposite end of the plunger 188 is attached to a switch arm 190 movable between a pair of fixed contacts 191 and 192 controlling electrical circuits for an indicating green light 193 and an indicating red light 194 suitably mounted in some remote position on a panel board 195.

When the pneumatic relay 10 is in a safe pressurized condition and is giving a green indication through its window assembly 112, an electrical circuit for the remote indicator 193 may be traced as follows: from power line L1 through conductor 196, green light 193, conductor 197, contact 191, switch arm 190, and power line L2.

In the event the monitored variable is outside the safe limits, the transmitter valve 184 permits the depressurization of the pneumatic relay 10 as described above whereby the indicating lever 130 is rotated clockwise about the pivot pin 140 permitting the switch plunger 188 to move to the left as viewed in FIG. 7 in following the lever leg 138. A red indicator may be viewed through the window assembly 112 and an electrical circuit for the remote indicator 194 may be traced as follows: power line L1 through conductor 198, red light 194, conductor 199, contact 192, switch arm 190, and power line L2.

With the arrangement of FIG. 7, a master control panel may be located in any suitable position to give an instantaneous visual indication of an engine malfunction. It is also to be understood that an audio alarm may be utilized in conjunction with the electrical circuit.

FIGS. 8 and 9 disclose a pneumatic receiver indicator 210 similar to that of FIG. 3 except that it is utilized only as a warning device that the engine variable being monitored has become unsafe. Such an arrangement has particular use in monitoring those engine variables which are deemed not to be sufficiently serious to warrant engine shut down. In the following description, similar reference numerals have been used to illustrate similar structure shown in FIGS. 3 and 4.

As is illustrated in FIG. 8, a side face of the body member 212 is provided with a pair of spaced bores 34 and 82 defining a supply port and a transmitter port, respectively. The undersurface of the body member 212 is notched to define one wall of a pressure cavity 52, the other wall being defined by the top of flexible diaphragm 22. A passageway 250 extends between the cavity 52 and the supply port 34 to establish communication therebetween. The inner end of the transmitter port 82 defines a transmitter pressure chamber 280 which communicates with the cavity 54 in the body member 16 by means of a passageway 236, a suitable hole in the diaphragm 22, and the passageway 56.

As is shown in dashed lines in FIG. 9, the supply port 34 is provided with a bypass passage 238 having a generally L-shaped configuration which establishes communication between the supply port 34 and the orifice chamber 88. The top of the body member 212 is provided with a through bore 84 and a transmitter port 82 which are drilled so as to be perpendicular to each other and communicating at the point of intersection.

The pneumatic system illustrated in FIG. 10 will now be described. Air is supplied to the receiver indicator supply port 34 under the control of the manual valve 180. In the event the transmitter valve 184 is in an open position, as an indication of an unsafe condition of the monitored variable, the inlet supply pressure in chamber 52 will cause actuation of the indicating lever 130 so that its red portion will be visible through the window assembly 112. Assuming that the monitored variable has been returned to within safe limits, the transmitter valve 184 will be closed permitting the receiver indicator to be pressurized.

The supply of air flows from the inlet port 34 through the bypass passageway 238, the orifice chamber 88, the restricted orifice 96, the orifice passage 98 and the through bore 84 into the transmitter pressure chamber 280. By means of the passageway 236 and passageway 56, the pressure in the transmitter pressure chamber 280 is transmitted to the cavity 54 to equalize the pressure differential across the flexible diapraghm 22 and permit the coil spring 66 to return the actuator plunger 58 to its retracted position. At the same time, air is supplied to the reset mechanism 160 by the conduit means 176 so that the indicating lever 130 is moved by the reset mechanism to its green or safe position. It should be noted that the receiver indicator 210 could also be connected to an electric switch as shown in FIG. 7 for a remote panel installation.

FIG. 11 discloses a modification of the reset mechanism which may be utilized with any of the foregoing devices in place of the automatic reset mechanism 160. As is illustrated in FIG. 11, a manual type reset mechanism 260 includes a cylindrical housing 262 secured through a suitable opening in the front of the annunciator housing 100. A push button 267 has an actuator plunger 272 on its inner end. The actuator plunger 272 protrudes through a suitable opening in the bottom wall of the cylindrical housing 262 and engages the rear leg 138 of the indicating lever 130. A coil spring 270 surrounds the actuator plunger in the housing 262 and is mounted in compression between the plunger button and the bottom wall of the housing 262. A snap ring 271 mounted exterior of the housing 262 adjacent the ends of the actuator plunger 272 maintains the push button in its assembled relationship.

In certain installations, it may be desirable that the indicating lever 130 remain in its red position until manually reset by depressing the push button 267. Such a button 267 may be used with the pneumatic relay indicator of FIG. 3 and the receiver indicator of FIG. 8.

Inasmuch as the description and drawings are subject to various changes in structural details and reversal of parts, it is intended that the foregoing description and drawings be interpreted as illustrative and not in a limiting sense.

I claim:
1. In a pneumatic indicating device, the combination comprising a valve body having an inlet pressure chamber adapted to be connected to a pneumatic supply and a transmitter pressure chamber adapted to be connected to a condition responsive transmitter, means including a restricted orifice to establish communication between said inlet pressure chamber and said transmitter pressure chamber, differential pressure responsive actuating means carried by said valve body, a passageway communicating with said inlet pressure chamber and establishing a first pressure for said pressure responsive means, a second passageway communicating with said transmitter pressure chamber and establishing a second pressure for said pressure responsive means, indicating means operatively disposed for movement by said pressure responsive actuating means to a position to indicate the existence of a differential pressure acting on said pressure responsive means, and reset means for returning said indicating means to a position to indicate the existence of equal pressure on said pressure responsive means.

2. The combination as recited in claim 1 wherein said reset means comprises a pneumatically operated plunger operatively associated with said indicating means, biasing means urging said plunger away from said indicating means, and conduit means connected to said transmitter pressure chamber for pneumatically moving said plunger against said biasing means in response to pressure in said transmitter pressure chamber.

3. The combination as recited in claim 1 wherein said reset means comprises a manually operable push button operatively associated with said indicating means.

4. In a pneumatic relay, the combination comprising a valve housing, valve means movable between controlling positions within said housing, indicating means mounted externally of said housing and movable between a plurality of indicating positions, actuating means for said indicating means mounted within said housing and movable between positions in accordance with the position of said valve means, said indicating means including an indicating lever pivotally mounted externally of said housing and a latching lever cooperable with said indicating lever for securing the same in one of said positions, spring means extending between said indicating lever and said latching lever for rotating said indicating lever to one of said indicating positions, and reset means cooperable with said indicating lever for rotating said indicating lever to another of said indicating positions.

5. The combination as recited in claim 4 wherein said reset means comprises a manually operated push button operatively associated with said indicating lever.

6. In a pneumatic control relay, the combination comprising a valve casing, valve means movable between controlling positions within said valve casing, external indicating means for indicating the position of said valve within said casing, said indicating means including a housing mounted on said valve, an indicating lever pivotally mounted in said housing and movable between indicating positions, latching lever means pivotally mounted within said housing and movable between latched and unlatched positions cooperable with said indicating lever for securing the same in one of said indicating positions, spring means extending between said latching lever and said indicating lever for biasing said indicating lever toward one of said indicating positions, said spring means simultaneously biasing said latching lever into said latched position, and actuating means cooperable with said valve means and movable between actuating positions in accordance with the position of said valve means, said actuating means engageable with said latching means in one of said actuating positions for unlatching said latching lever from said indicating lever, said actuating means being disengaged from said latching means in another of said positions.

7. In a pneumatic relay indicator, the combination comprising a valve body having an inlet pressure chamber adapted to be connected to a pneumatic supply, a transmitter pressure chamber adapted to be connected to a condition responsive transmitter, an atmospheric pressure chamber, and a control pressure chamber adapted to be connected to a control device, bypass means establishing communication between said inlet pressure chamber and said transmitter pressure chamber, orifice means in said bypass means for restricting pneumatic flow to said transmitter presure chamber, valve means operable in response to pressure in said transmitter pressure chamber for preventing a pneumatic flow from said control pressure chamber to said atmospheric pressure chamber and for permitting a pneumatic flow from said inlet pressure chamber to said control pressure chamber, diaphragm operated actuating means movable in response to a differential pressure between said inlet pressure chamber and said control pressure chamber, indicating means operatively disposed for movement by said actuating means from a set position to an actuated position indicative of a differential pressure acting on said actuating means, and reset means for returning said indicating means to its set position independently of said actuating means.

8. The combination as recited in claim 7 wherein an electric switch is operatively associated with said indicating means for actuation thereby, and remotely located indicator means is electrically controlled by said switch.

9. The combination as recited in claim 7 wherein said indicating means comprises a pivoted indicating lever, a pivoted latching lever, detent keeper means for retaining said levers in a latched position, and wherein said actuating means moves said latching lever to release said detent keeper means and said reset means moves said indicating lever to reset said detent keeper means.

10. The combination as recited in claim 9 wherein said reset means comprises a manually operated push button and a plunger engageable with said indicating lever.

11. The combination as recited in claim 9 wherein said reset means comprises a pneumatically operated plunger operatively disposed for actuation of said indicating lever, and conduit means communicating with said transmitter pressure chamber whereby said plunger is operated in response to pressure in said transmitter pressure chamber.

12. In a control system for controlling and monitoring a variable condition in accordance with variations in the condition as sensed by condition responsive sensing means, a pneumatic indicating relay comprising a valve body having a transmitter port adapted to be controlled by the condition responsive sensing means and thereby alternately disconnected from ambient atmosphere when the condition is within selected limits and connected with ambient atmosphere when the condition departs from said selected limits, said valve body having a supply port, a vent port and a control port, restricted passage means in said valve body connecting said supply port to said transmitter port, valve means in said valve body operable in a first position to connect said control port to said vent port and operable in a second position to isolate said control port from said vent port, pressure resposnive means in said valve body subject on one side to the pressure existing at said transmitter port and operable when subjected on said one side to ambient atmospheric pressure through said transmitter port to locate said valve means in said first position and operable when subjected on said one side to a pressure other than ambient atmospheric pressure when the transmitter port is disconnected from ambient atmosphere by the condition responsive sensing means to locate said valve means in said second position, and indicating means operable by said valve means for exhibiting a first visual signal when said valve means is in said first position and for indicating a second visual signal when said valve means is in said second position to thereby indicate whether the control port is connected to or isolated from the vent port.

13. A control means comprising: a casing means having a pressure fluid supply port, a transmitter port to be vented and unvented by a transmitter, vent means, and a control port; a fluid supply restrictor providing restricted flow of pressure fluid from said supply port to said transmitter port; a first diaphragm movable in response to differences in fluid pressures between said transmitter port and said vent means caused by the venting and unventing of said transmitter port; vent valve means moved by said first diaphrgam to connect and vent and to disconnect and unvent said control port to and from said vent means; a second diaphragm movable in response to differences in fluid pressures between said supply port and said control port; an indicator moved to a first indication when said first diaphragm is in its position when said transmitter port is unvented and released to return to a second indication by spring action when said transmitter port is vented; and an indicator latch means governed by said second diaphragm for latching of said indicator in said first indication and to unlatch said indicator for return to said second indication.

14. A control means according to claim 13 having a lost motion means effective in response to pressure conditions created when said transmitter port is not vented to move said indicator to latched position but ineffective to move said indicator from latched position when said indicator is latched by said latch means.

15. A control means according to claim 14 having a first spring means biasing said first diaphragm and vent valve means to control port vented position, and having second spring means biasing said second diaphragm and said latch means to indicator latching position.

16. A control means comprising: control and indicating means having a pressure fluid supply port, a transmitter port to be vented and unvented by a transmitter, vent means, and a control port; a fluid supply restrictor providing restricted flow of pressure fluid from said supply port in said transmitter port; a first diaphragm movable in response to the venting and unventing of said transmitter port; vent valve means moved by said first diaphragm to connect and vent and to disconnect and unvent said control port to and from said vent means; a second diaphragm movable in response to the venting and unventing of said control port; an indicator moved to a first indication when said first diaphragm is in its position when said transmitter port is unvented and released to return to a second indication by spring action when said transmitter port is vented; and an indicator latch means governed by said second diaphragm for latching of said indicator in said first indication and to unlatch said indicator for return to said second indication.

17. A control means according to claim 16 having a lost motion means effective in response to pressure conditions created when said transmitter port is not vented to move said indicator to latched position but ineffective to move said indicator from latched position when said indicator is latched by said latch means.

18. A control means according to claim 17 having a first spring means biasing said first diaphragm and said vent valve means to control port vented position, and having second spring means biasing said second diaphragm and said latch means to indicator latching position.

References Cited in the file of this patent

UNITED STATES PATENTS

| | | |
|---|---|---|
| 2,505,118 | Holmes | Apr. 25, 1950 |
| 2,632,465 | Schweisthal | Mar. 24, 1953 |
| 2,638,117 | Horn | May 12, 1953 |
| 2,700,362 | Calling | Jan. 25, 1955 |
| 3,028,878 | Natho | Apr. 10, 1962 |